US008456579B2

(12) United States Patent
Sano et al.

(10) Patent No.: US 8,456,579 B2
(45) Date of Patent: Jun. 4, 2013

(54) DYNAMIC RF AGC SWITCH/MIXER FOR OPTIMAL NTSC VIDEO DETECTION

(75) Inventors: Hiromichi Sano, Narashino (JP); William Bennett, Vista, CA (US); Liviu Burciu, Loma Linda, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1093 days.

(21) Appl. No.: 12/069,453

(22) Filed: Feb. 11, 2008

(65) Prior Publication Data

US 2009/0201426 A1    Aug. 13, 2009

(51) Int. Cl.
H04N 5/52    (2006.01)

(52) U.S. Cl.
USPC .................. 348/678; 455/234.1; 455/234.2

(58) Field of Classification Search
USPC .................. 348/678; 455/234.1, 234.2
See application file for complete search history.

(56) References Cited

U.S. PATENT DOCUMENTS

| | | | |
|---|---|---|---|
| 4,754,281 A * | 6/1988 | Donath ........................ | 342/417 |
| 5,465,408 A | 11/1995 | Sugayama et al. | |
| 6,148,189 A | 11/2000 | Aschwanden | |
| 6,333,765 B1 * | 12/2001 | Okada et al. .................. | 348/678 |
| 7,081,926 B2 | 7/2006 | Jeong et al. | |
| 7,116,955 B2 | 10/2006 | Schaffer et al. | |
| 7,212,798 B1 * | 5/2007 | Adams et al. ............... | 455/251.1 |
| 8,009,776 B2 * | 8/2011 | Gao et al. ....................... | 375/345 |
| 2004/0004673 A1 * | 1/2004 | Jeong et al. ..................... | 348/678 |
| 2004/0233841 A1 * | 11/2004 | Sanada et al. .................. | 370/210 |
| 2006/0164563 A1 * | 7/2006 | Watanabe et al. .............. | 348/731 |
| 2006/0222116 A1 | 10/2006 | Hughes et al. | |
| 2008/0242249 A1 * | 10/2008 | Gomez et al. ............... | 455/234.1 |
| 2009/0116586 A1 * | 5/2009 | Arambepola et al. ........ | 375/324 |

FOREIGN PATENT DOCUMENTS

| | | |
|---|---|---|
| JP | 06-097847 | 4/1994 |
| JP | 08-084089 | 3/1996 |
| JP | 2001-069424 | 3/2001 |
| JP | 2004-282464 | 10/2004 |
| WO | WO 2005/009034 A1 | 1/2005 |

OTHER PUBLICATIONS

"A tri-mode 802.11 baseband PHY mixed signal integrated circuit in 0.13 um CMOS," Philip Ryan, Brian Hart, Mike Webb and Kevin Wong; Cisco Systems, Wireless Networking Business Unit; Dec. 2003.
"High Performance Narrowband Receiver Design Simplified by IF Digitizing Subsystem in LQFP," Paul Hendricks, Richard Schreier, and Joe DiPilato; Analog Dialogue 35-3; 2001.

* cited by examiner

*Primary Examiner* — Brian Pendleton
*Assistant Examiner* — Nnenna Ekpo
(74) *Attorney, Agent, or Firm* — Sony Corporation

(57)    ABSTRACT

This disclosure presents an apparatus and method for automatic gain control correction for a television signal in which the Radio Frequency (RF) and Intermediate Frequency (IF) power signal levels are collected for a band of channels, identifying a channel having a strong RF power signal level and an IF gain signal level that is lower than a nominal IF gain signal level, comparing the identified channel RF gain signal level with the RF gain signal level of adjacent channels to identify the relative power signal levels of the channel and associated adjacent channels, and applying correction to the channel wherein there is an imbalance in the RF and IF power signal levels of the identified channel. This abstract is not to be considered limiting, since other embodiments may deviate from the features described in this abstract.

18 Claims, 4 Drawing Sheets

DYNAMIC RF AGC SWITCH/MIXER FOR OPTIMAL NTSC VIDEO DETECTION

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

Most if not all television sets utilize Automatic Gain Control (AGC) correction to improve the signal level for incoming channels when the signal is determined to be too weak or strong to provide a good quality visual representation of the video received on the tuned channel. AGC provides signal boost automatically in situations where the gain on a received channel requires additional signal strength. Most receivers feed back the detected peak power at the output of the Radio Frequency (RF) amplifier as a mechanism to control the RF AGC. There are significant advantages to using this detected value for AGC, but the most critical is signal to noise ratio. AGC can be used to control gain stages for both (RF) signals and Intermediate Frequency (IF) signals. A combination of control of gain at both RF and IF AGC may also be used to implement more robust gain correction.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
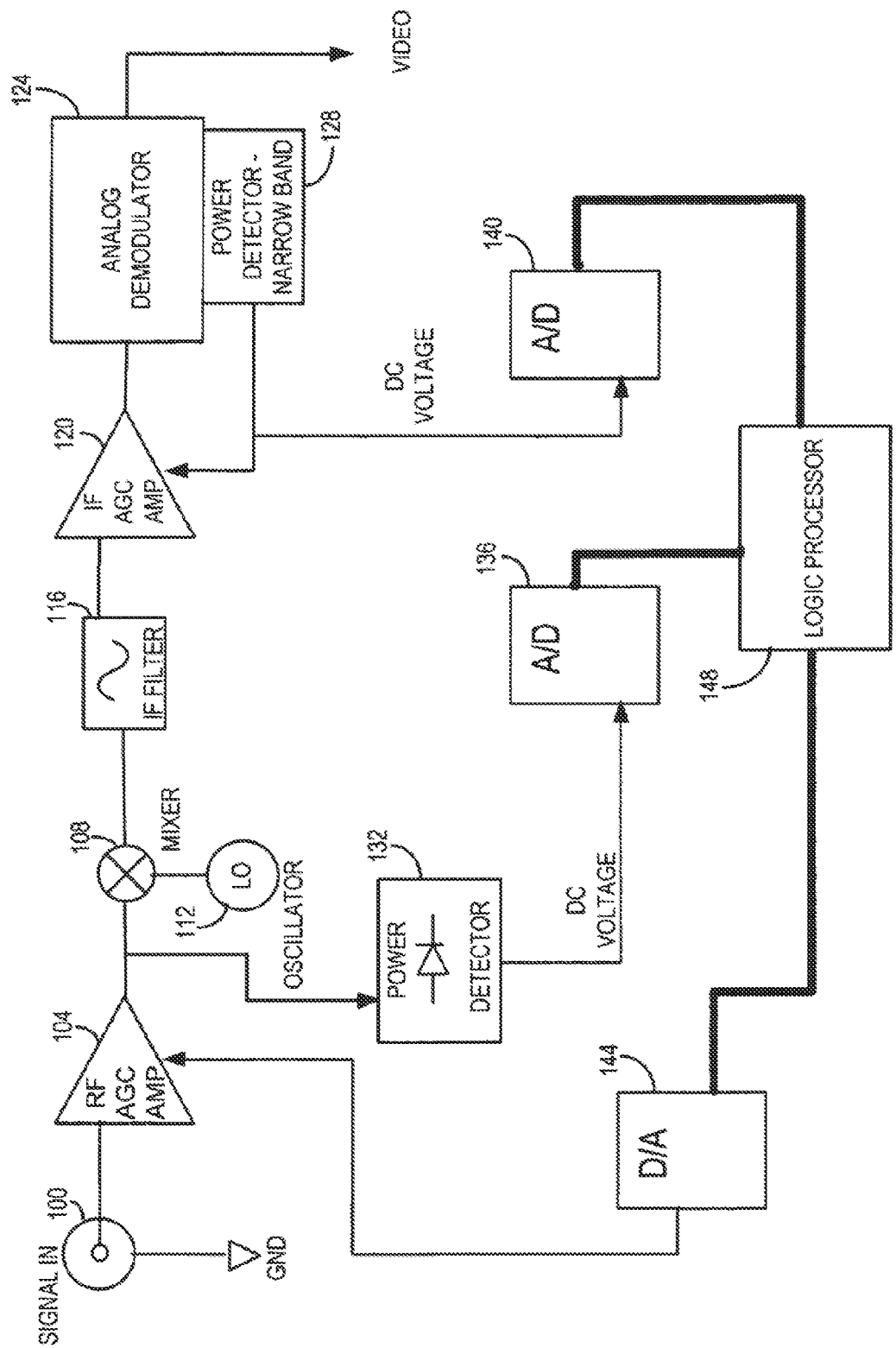
FIG. 1 is a diagram of exemplary digital system connectivity consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one, or more than one. The term "plurality", as used herein, is defined as two, or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Those skilled in the art will recognize, upon consideration of the above teachings, that certain of the above exemplary embodiments are based upon use of a programmed processor. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Certain embodiments may be implemented using one or more programmed processors executing programming instructions that in certain instances are broadly described above in flow chart form that can be stored on any suitable electronic or computer readable storage medium (such as, for example, disc storage, Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies) and/or can be transmitted over any suitable electronic communication medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain embodiments herein were described in conjunction with specific circuitry that carries out the functions described, other embodiments are contemplated in which the circuit functions are carried out using equivalent embodiments executed on one or more programmed processors. General purpose computers, microprocessor based computers, micro-controllers, optical computers, analog computers, dedicated processors, application specific circuits and/or dedicated hard wired logic and analog circuitry may be used to construct alternative equivalent embodiments. Other embodiments could be implemented using hardware component equivalents such as special purpose hardware and/or dedicated processors.

In most television sets the receiver detects peak power at radio frequencies for a band of channels and utilizes this detected peak power to control the Radio Frequency (RF) Automatic Gain Control (AGC). When a signal is received at the television set, the peak power is detected for the channel to which the television set is tuned. In an exemplary embodiment, when the received signal originates from an antenna a strong RF power signal for a channel could be in the range of −40 to −20 dBm, a nominal RF power signal could be in the range of −50 dBm to −40 dBm, and a weak RF power signal could be in the range of −80 dBm to −51 dBm. With respect to the IF power signal level, the IF power signal is scaled to the RF power signal level and has as a nominal value the value required to produce a clear output video when the RF power signal is in the nominal range. Thus, the nominal IF power signal level is that level achieved when the RF power signal level is in the nominal range as defined above. For a weak RF power signal level, the IF power signal level may be in the range of −10 dB to −20 dB from nominal. In addition, a tuner may add attenuation which can lower the signal power still further, thus making the desired channel signal power too low to demodulate. The RF AGC is engaged in cases where signal power, as measured at radio frequencies, is normal to strong that would create distortion in the video signal or had attenuation not been added. Sometimes the RF signal is low enough that noise remains in the picture even after the RF AGCs attenuation is disengaged. In many television sets engaging a delayed RF AGC, an AGC with a longer time constant, is a method used to attempt to optimize the RF gain and thereby reduce the noise in the picture.

Still other receivers use the effective broadband Intermediate Frequency (IF) power product as a method of control over the RF AGC gain. This method may be optimal in the presence of multiple channel signals to ensure that the receiver is not over driven to create non-linear products which will affect the picture signal. This method works well when the RF peak power signal on the channel to which the television is tuned is a strong signal.

However, when the instant television tunes in a channel and the peak power signal for a band of channels is detected within the tuner, the peak power for all channels within that band is set by the strongest peak power signal level within the band without much regard for the signal strength of the desired channel. Under normal circumstances the strongest peak power is associated with the desired channel that has been selected for viewing. However, there are occasions when the channel tuned does not have the strongest peak power signal level within the band of channels. Instead, a channel adjacent to the channel selected has a stronger peak power level. In this circumstance the RF AGC turns the gain on the signal down in response to the RF power signal level of the adjacent channel, thus possibly driving the gain on the desired channel down so low that the tuned channel displays a lot of noise in the picture, or displays no signal at all. The television may attempt to correct the reduction in RF gain by increasing the gain from the IF AGC, however the gain on the signal has been turned so far down that the IF AGC cannot produce a usable signal and the signal to noise ratio cannot be enhanced significantly by increasing the gain at the IF.

Certain embodiments are presented wherein the system monitors both the RF and IF AGC peak power sources to detect an imbalance between the two peak power detected values where power signal ranges are defined as above, in one illustrative example, to detect situations where the RF power signal value is within the strong range and the IF power signal value remains at nominal level. The embodiments presented then mix or switch the gain values of the IF to the RF AGC values to appropriately adjust the RF gain of the strong signals to present an improved quality picture, where the improvement in quality is measured as minimizing or eliminating distortion.

In all cases, it is the gain of the RF amplifier that is manipulated to improve the quality of the output video. This is accomplished by lowering the gain or adding attenuation to lower distortions or by increasing the gain or removing attenuation to improve noise. The AGC gain adjustment derived from a strong RF power signal value is sufficient to correct distortion in a video signal output to a video receiver. When RF power signal values are in the weak range and IF power signal value remains in the nominal range, indicating an imbalance, the AGC gain adjustment derived from the IF power signal level is operative to provide an improved output video signal. In an additional exemplary embodiment, when the RF power signal value is in the weak range and the IF power signal value is >/=−10 dB from nominal, a logic processor may be employed to combine the AGC gain adjustments for both the RF and IF signals to improve the output video signal.

Turning now to FIG. 1, consistent with certain embodiments of the invention this figure presents an exemplary view of one possible system configuration. The input signal 100 is sampled by a power detector 132 to determine the RF signal peak power value. The input signal 100 is combined with the signal from a local oscillator 112 in the mixer 108 to convert the RF input to an intermediate frequency range and shift noise and harmonics such that they may be removed when the mixed signal is passed through an IF filter 116. This filtered signal is then passed to the demodulator 124 where an associated narrow band power detector 128 samples the IF signal peak power value. The RF peak power value from 132 and the IF peak power value from 128 are passed as input to analog to digital (A/D) converters 136 and 140 respectively and the resultant digital signals are passed to a microprocessor or other processor device 148.

In an illustrative embodiment of the invention the microprocessor 148 contains logic to detect any imbalance between the RF power signal value and the IF power signal value. In an exemplary embodiment, if the RF power signal level for the tuned channel is strong and the IF power signal level is at nominal level, the microprocessor determines that there is an imbalance caused by adjacent channels that will cause the IF AGC to not reduce the RF gain enough. In this situation, the microprocessor overrides the IF AGC control and replaces it with the effective broadband Intermediate Frequency (IF) power product AGC gain value. This value is passed to a D/A converter 144 and the signal output from the D/A converter 144 is applied to the RF AGC amplifier 104. In this manner, the strong RF input signals will be reduced enough and the output video signal will not be distorted.

In another exemplary embodiment, the microprocessor 148 may compare the RF and IF power signal levels and determine that the RF signal is weak and that the IF power signal level is below nominal. In this instance, the microprocessor 148 may then combine the gain for the RF AGC to the gain for the IF AGC and transmit this signal level to the D/A 144 for conversion. The D/A 144 output is then input to the RF pre-amplifier and applied to the circuit to maximize the gain for very weak signals. The amplification to the video signal is maximized for display to the user.

In an exemplary embodiment where the RF peak power signal for the tuned channel is strong, the microprocessor 148 does not override the IF AGC. In this fashion, the microprocessor 148 may determine the best combination of RF and IF detected power for use in control of the RF AGC value to preserve the best picture output, both minimizing noise and minimizing distortion.

Figure 2:
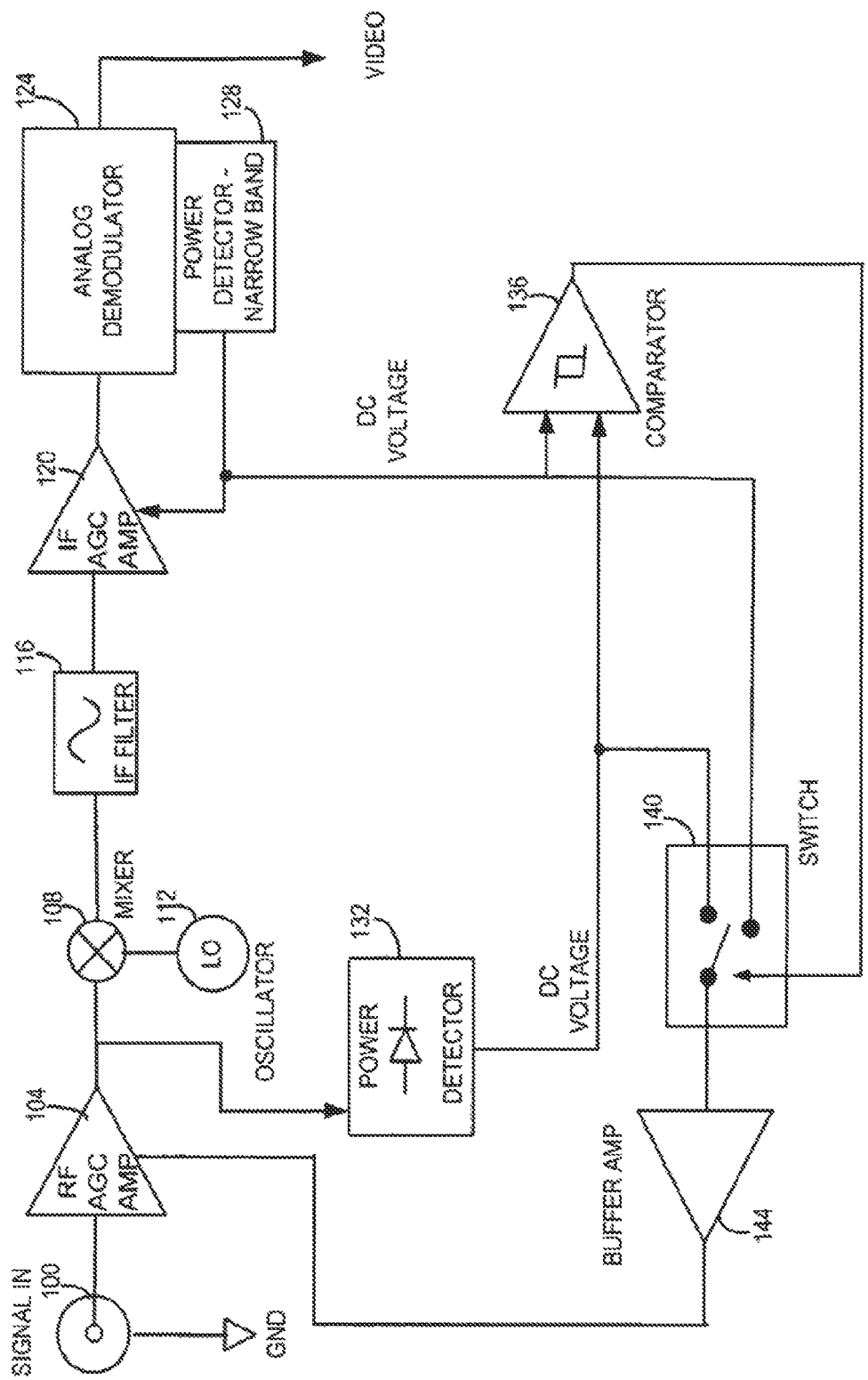
FIG. 2 is a diagram of exemplary analog system connectivity consistent with certain embodiments of the present invention.

Turning now to FIG. 2, consistent with certain embodiments of the invention this figure presents a view of the content transfer and some indication in this exemplary embodiment of the direction in which content may flow. The input signal 100 is sampled by a power detector 132 to determine the RF signal peak power level. The input signal 100 is combined with the signal from a local oscillator 112 in the mixer 108 to shift noise and harmonics such that they may be removed when the mixed signal is passed through an IF filter 116. This filtered signal is then passed to the demodulator 124 where an associated narrow band power detector 128 samples the IF signal peak power level. The RF peak power level and the IF peak power level are passed as input to an analog comparator 136 (which may provide weighting to the two inputs so that the comparison is not necessarily a direct one-to-one comparison, but rather is a comparison of suitably scaled relative outputs).

When an imbalance between the IF peak power level and the RF peak power level is detected by the comparator 136, the comparator 136 sends a signal to a selector switch 140. This selector switch is active to switch between the RF AGC and the IF AGC, which comprise the poles of the switch 140. When there is an imbalance such that the RF power signal level is in the strong range and the IF power signal level is at nominal level, the comparator 136 sends a signal to the switch 140. This signal is operative to replace the IF AGC gain value with the RF AGC gain value and pass the result from the output of the switch 140 to a buffer amplifier 144 (which may have unity gain or other suitable gain factor for use in control of the RF gain of RF amplifier 104). The output is then provided to the RF AGC amplifier 104 as the proper gain value for the incoming channel signal.

In other exemplary embodiments including television equipment that does not contain the instant invention, a television tuner may not include the IF detector for the RF AGC. These tuners rely upon the RF AGC voltage to provide the IF power signal level. In this embodiment there may be some loss of video signal to noise in the range of 1 to 2 dB, at −45 dBm input. The signal power used by most cable companies to deliver cable to the home is −45 dBm. In these circumstances, the use of the RF AGC voltage to set the IF power signal level could cause the IF AGC to adjust the gain to a non-optimal gain, introducing noise in the output video signal.

Additionally, for those input signals that are received from an antenna, when the incoming tuned channel is adjacent to channels with stronger power signal levels the RF AGC voltage may not necessarily over drive the mixer but it also does not achieve the best signal to noise level. The instant invention would correct these issues by switching in the IF AGC gain adjustment on the original signal and ignoring the RF AGC gain adjustment, restoring the video signal output and providing the best signal to noise level for the video output.

In other exemplary embodiments, a television tuner that contains the instant invention may not include the RF detector for the RF AGC. The tuners within these television sets rely upon the IF AGC voltage to provide the IF power signal level. In this embodiment there may be some loss of linearity due to over driven conditions caused by strong adjacent channels as received from an antenna. Once again, the instant invention is active to replace the IF AGC gain level with the RF AGC gain level and pass the result from the output of the switch 140 to a buffer amplifier 144 (which may have unity gain or other suitable gain factor for use in control of the RF gain of RF amplifier 104). The output is then provided to the RF AGC amplifier 104 as the proper gain value for the incoming channel signal.

Figure 3:
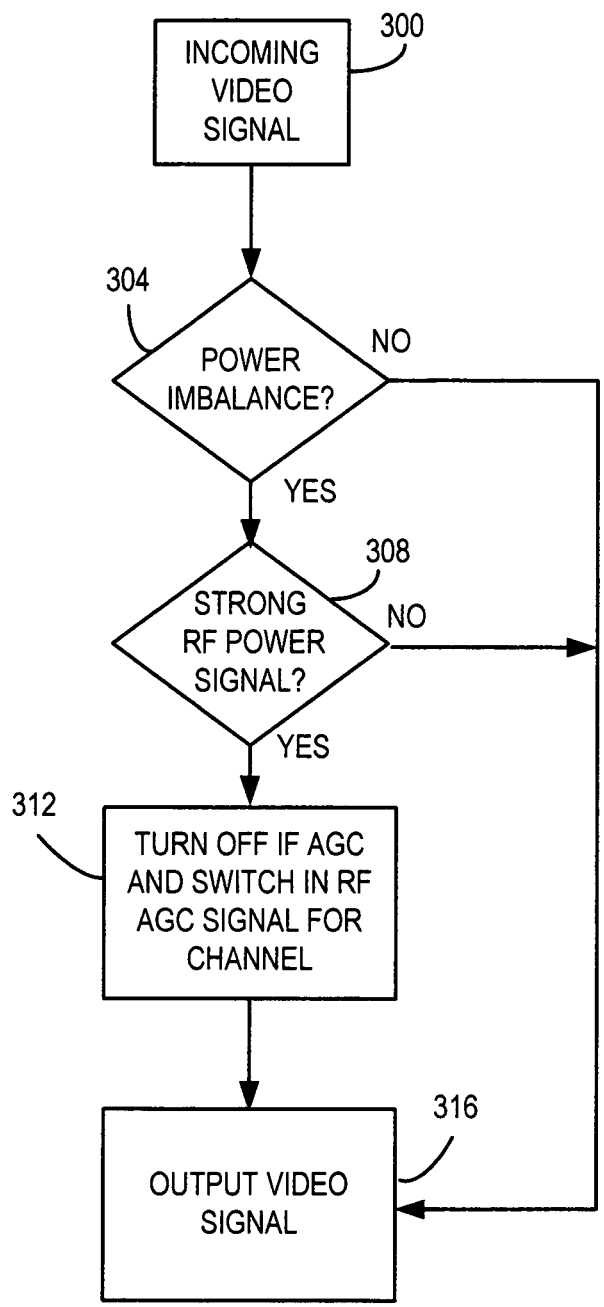
FIG. 3 is an illustrative decision flow of an analog implementation consistent with certain embodiments of the present invention.

Turning to FIG. 3 consistent with certain embodiments of the invention the incoming video signal 300 is sampled to detect the peak RF power signal level and the peak IF power signal level. If the peak RF power signal level is in the strong range 308 (as defined above) and the IF power signal level is also in the normal or strong range there is no imbalance 304 between the signal strengths for the RF and IF power signal levels. When the RF power signal value is in the strong range and the IF power signal value is in the strong or normal value range with respect to the RF value, the system is operative to apply the nominal IF AGC power signal value to the output video signal and transmits this modified signal to the video display 316.

If the RF power signal level is strong, the system uses the sampled IF power signal level to determine if the IF power signal value is at nominal or below. If the IF power signal level is at nominal this indicates an imbalance in the power signal levels between the RF amplifier stage and the IF amplifier stage 304. The RF AGC attempts to apply an RF gain correction to the incoming signal that is measured against a strong RF input power signal level as measured from the channel band. However, in this instance. the strongest power signal level is a channel within the channel band other than the channel being tuned. Therefore, when the RF AGC attempts to apply a gain correction that gain correction adjusts for a strong power signal and, thus, adjusts the incoming video signal to a very weak level, one that is too weak to amplify into a viewable output video signal.

To apply a correction for the imbalance, the system replaces the RF AGC gain value, which, again, is too high for the incoming signal power level, with the IF gain value 312. That is, the RF amplifier's 104 gain can be controlled on the basis of either the RF power or the IF power. In all cases, the RF power signal level and the IF power signal level should be within the same relative power signal band as defined above. If the RF power signal is weak, the IF power signal should be at or below nominal, and if the RF power signal level is strong, the IF power signal level should be at or above nominal. The situation in which there is an imbalance between these two values (for example, RF power signal strong and IF power signal below nominal) means that the measured RF power level is somehow incorrect. In the exemplary embodiment, the measure of a stronger channel within a channel band that is used as the average power level for all channels in the band means that if the tuner is tuned to a channel within that band for which the power level is weaker, the IF AGC (AGC control derived from the RF power) will mistakenly apply too much gain correction. Thus, the gain correction value applied by the RF AGC must be replaced by the more accurate gain correction value determined by the RF power signal measurement in order to achieve an optimum video signal output 312. This replacement provides for an output video signal 316 with a minimized distortion and minimized noise in the displayed video program.

Figure 4:
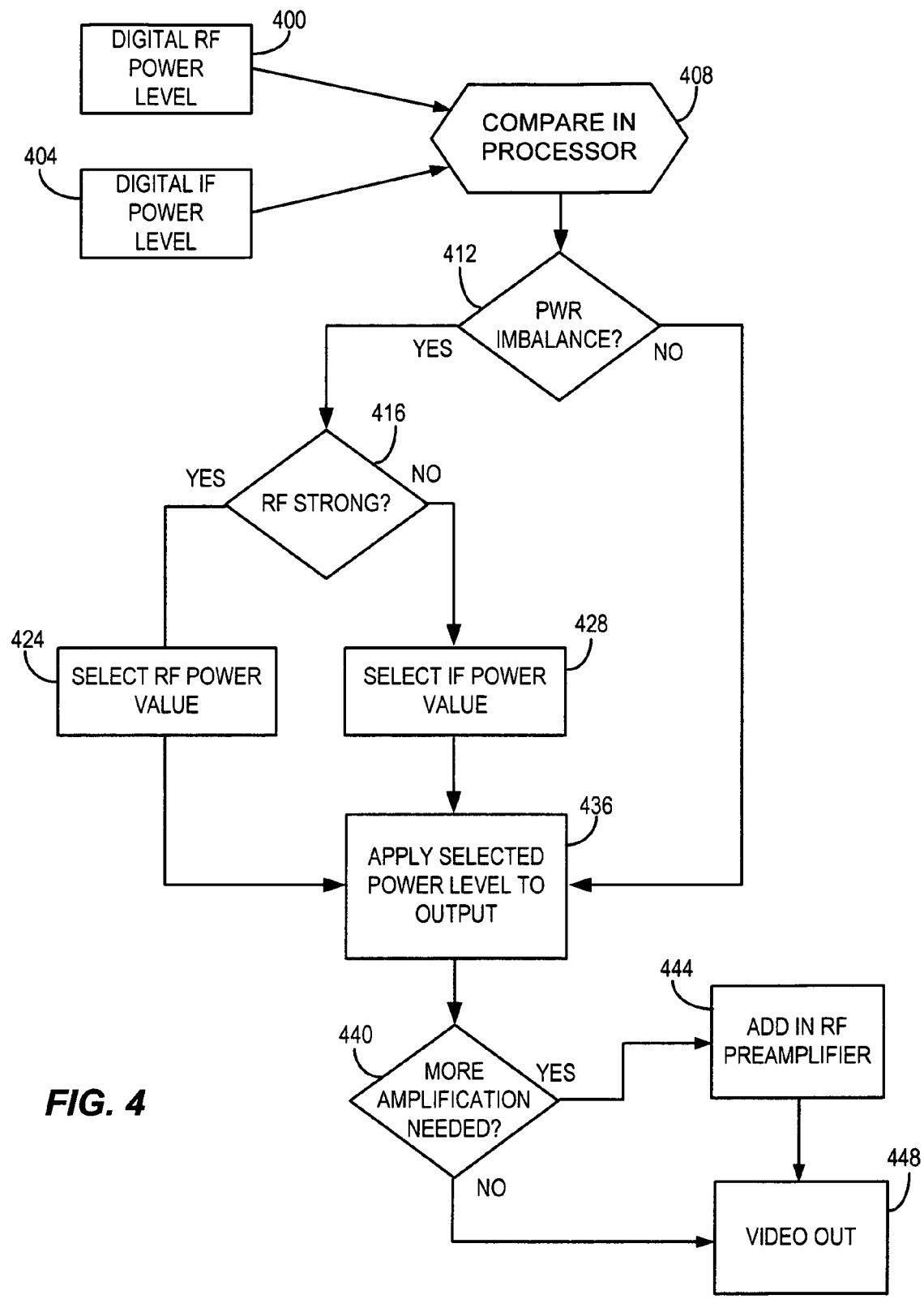
FIG. 4 is an illustrative decision flow of a digital implementation with certain embodiments of the present invention.

Turning to FIG. 4, this figure is illustrative of an exemplary embodiment in which the digital RF power level 400 and digital IF power level 404 signals are passed as inputs to the microprocessor 148. The microprocessor 148 instantiates a comparison module 408 to determine if there is an imbalance between the RF and IF power signal levels 412. If there is no imbalance between the RF and IF power signal levels the microprocessor simply transmits the RF power signal level through the D/A converter 144 and then to the RF AGC amplifier 104.

When there is an imbalance between RF and IF power signal levels the microprocessor determines if the RF power signal level is in the weak range or the strong range 416 in an attempt to improve the output video. If the RF power signal level is in the strong range, the microprocessor module selects the RF power signal value and transmits the RF power signal value through the D/A converter 144 and then to the RF AGC amplifier 104.

If, however, for the tuned channel the RF power signal is in the weak range, as defined above, and the IF power signal level is in the nominal range an imbalance exists that may cause the loss of the video signal through an inappropriate application of the RF AGC gain correction. In this instance, the strongest power signal value is not the power signal value of the channel being tuned, but, rather, the RF power signal value for the strongest channel within the channel band. As such, when the RF AGC attempts to apply a gain correction (based upon the RF power level for the strongest channel within the channel band), that gain correction adjusts for a strong power signal and, thus, adjusts the incoming video signal to a very weak level, one that is too weak to amplify into a viewable output video signal. To apply a correction for this imbalance between the weak RF power signal level and the nominal IF power signal level for the channel to be tuned, the RF power signal value is discarded by the microprocessor and the IF power signal value is substituted 428. Thus, the IF power signal value is transmitted through the D/A converter 144 and sent to the RF AGC amplifier to provide for an output video signal with a minimized distortion and minimized noise in the displayed video program.

In a further exemplary embodiment, the microprocessor 148 may also determine that additional amplification is required to enhance the strength of the output video 440 to increase the power signal level into the nominal signal strength range as defined above. In this instance, the system may contain an additional RF preamplifier that may be switched into the circuit to create this additional amplification 444 to the output signal.

For each exemplary embodiment the system may store in memory the RF and IF AGC gain levels that have been previously applied for each channel to be tuned. These values may then be restored from memory and used by the television to more quickly acquire the RF and IF AGC gain level values necessary for each tuned channel. The microprocessor may then apply these values and more quickly produce the video output level necessary to remove distortion and reduce noise for each channel.

The system presents certain embodiments for a method for automatic gain control correction comprising for collecting Radio Frequency (RF) and Intermediate Frequency (IF) power signal level values for a band of channels, identifying a channel having a strong RF power signal level value and an IF gain signal level value for the same channel, comparing the identified channel RF gain signal level with the RF gain signal level of adjacent channels to identify the relative power signal levels of the channel and associated adjacent channels, and applying correction to the channel wherein there is an imbalance in the RF and IF power signal levels of the identified channel.

Applying the correction may include turning off the Automatic Gain Control (AGC) for the IF signal and applying the AGC for the RF signal utilizing a programmed processor that is operative to control gain on the channel to prevent distortion on the channel. Correction signal levels applied to the identified channel are stored in non-volatile memory for future acquisition if a similar situation recurs, and applying correction may comprise switching in an RF preamplifier.

Certain embodiments may include an apparatus for automatic gain control correction including a power detector to detect the broadband RF power signal level of incoming channels, a power detector to detect the narrow band IF power signal level of incoming channels, an IF filter to identify a channel having an above nominal IF signal gain and a strong RF power signal level, and a comparator to compare the identified channel power signal with the RF voltage level of adjacent channels to identify the relative power signal levels of a channel and associated adjacent channels.

Along with these components, certain embodiments also include an RF Automatic Gain Control (AGC) amplifier and an IF AGC amplifier. The system utilizes the RF AGC amplifier and the IF AGC amplifier to apply correction to the RF and IF signal levels. The correction utilizes AGC correction to the identified channel by switching or mixing RF and IF gain levels to minimize noise and distortion on the identified channel.

In certain embodiments, the comparator is an analog comparator for analog signal systems and the RF AGC is replaced by the IF AGC.

In another embodiment the RF and IF power values are input to a microprocessor comparator for digital signal systems and the RF AGC is replaced by the IF AGC. In addition, the RF AGC and the IF AGC are mixed to create a higher gain level by allowing the microprocessor to maximize both RF and IF AGC for very weak input signals.

Correction signal levels applied to the identified channel are stored in non-volatile memory for future acquisition if a similar situation recurs and applying correction further comprises switching in an RF preamplifier.

While certain illustrative embodiments have been described, it is evident that many alternatives, modifications, permutations and variations will become apparent to those skilled in the art in light of the foregoing description.

What is claimed is:

1. A method for automatic gain control correction comprising:
    collecting Radio Frequency (RF) and Intermediate Frequency (IF) power signal level values for a band of channels;
    identifying an RF power signal level value and an IF power signal level value for an identified channel;
    comparing the identified RF power signal level value with the IF power signal level value of the identified channel to identify an imbalance between the RF power signal level value and the IF power signal level value;
    determining whether the identified RF power signal level value exceeds a predefined threshold in response to the identified imbalance;
    applying correction to the identified RF power signal level value of the identified channel when the identified RF power signal level value exceeds the predefined threshold.

2. The method as in claim 1, wherein applying correction further comprises turning off the Automatic Gain Control (AGC) for the IF signal and applying the AGC for the RF signal.

3. The method as in claim 1, wherein said applied correction is carried out by a programmed processor that is operative to control gain on the identified channel to prevent distortion on the identified channel.

4. The method as in claim 1, wherein correction signal levels applied to the identified channel are stored in non-volatile memory for future acquisition if a similar situation of imbalance between RF and IF power signal levels of the identified channel recurs.

5. The method as in claim 1, wherein applying correction further comprises amplifying an output video signal by an RF preamplifier.

6. An apparatus for automatic gain control correction comprising:
a tuner operable to identify a channel to be viewed;
a first power detector operable to detect broadband RF power signal level of the identified channel;
a second power detector operable to detect narrow band IF power signal level of the identified channel;
a comparator operable to compare the RF power signal level and the IF power signal level for the identified channel to identify an imbalance between the RF power signal level and the IF power signal, wherein the comparator determines whether the identified RF power signal level exceeds a predefined threshold in response to the identified imbalance;
an RF automatic gain control (AGC) amplifier operable to apply AGC correction to the identified RF power signal level of the identified channel when the identified RF power signal level exceeds the predefined threshold by switching or mixing RF and IF gain levels.

7. The apparatus as in claim 6, wherein the comparator is an analog comparator for analog signal systems.

8. The apparatus as in claim 6, wherein the RF and IF power signal levels are input to a microprocessor comparator for digital signal systems.

9. The apparatus as in claim 8, wherein the microprocessor is operable to mix RF AGC gain correction and IF AGC gain correction to increase a gain level of an output video signal.

10. The apparatus as in claim 9, wherein the microprocessor maximizes both the RF AGC gain correction and the IF AGC gain correction for input signals with signal strength values below a predefined range.

11. The apparatus as in claim 6, wherein the AGC correction applied to the identified channel is stored in non-volatile memory for future acquisition if a similar situation of imbalance between RF and IF power signal levels of the identified channel recurs.

12. The apparatus as in claim 6, wherein applying the AGC correction further comprises amplifying an output video signal by an RF preamplifier.

13. An apparatus for automatic gain control correction comprising:
a tuner operable to identify a channel to be viewed;
a first power detector operable to detect broadband RF power signal level of the identified channel;
a second power detector operable to detect narrow band IF power signal level of the identified channel;
a comparator operable to compare the RF power signal level and the IF power signal level for the identified channel to identify an imbalance between the RF power signal level and the IF power signal, wherein the comparator determines whether the identified RF power signal level exceeds a predefined threshold in response to the identified imbalance;
an RF Automatic Gain Control (AGC) amplifier; and
a processor operable to utilize the RF AGC amplifier to apply AGC correction to the identified RF power signal level of the identified channel when the identified RF power signal level value exceeds the predefined threshold by switching or mixing RF and IF gain levels.

14. The apparatus as in claim 13, wherein the comparator comprises an analog comparator for analog signal systems.

15. The apparatus as in claim 14, wherein the RF AGC correction is replaced with an IF AGC gain correction.

16. The method as in claim 1, further comprising applying gain correction to the IF power signal level value of the identified channel when the RF power signal level is below the predefined threshold.

17. The apparatus as in claim 6, further comprising an IF AGC amplifier operable to apply the AGC correction to the IF power signal level of the identified channel when the RF power signal level is below the predefined threshold.

18. The apparatus as in claim 13, further comprising an IF AGC amplifier operable to apply the AGC correction to the IF power signal level of the identified channel when the RF power signal level is below the predefined threshold.

* * * * *